Figure 1:
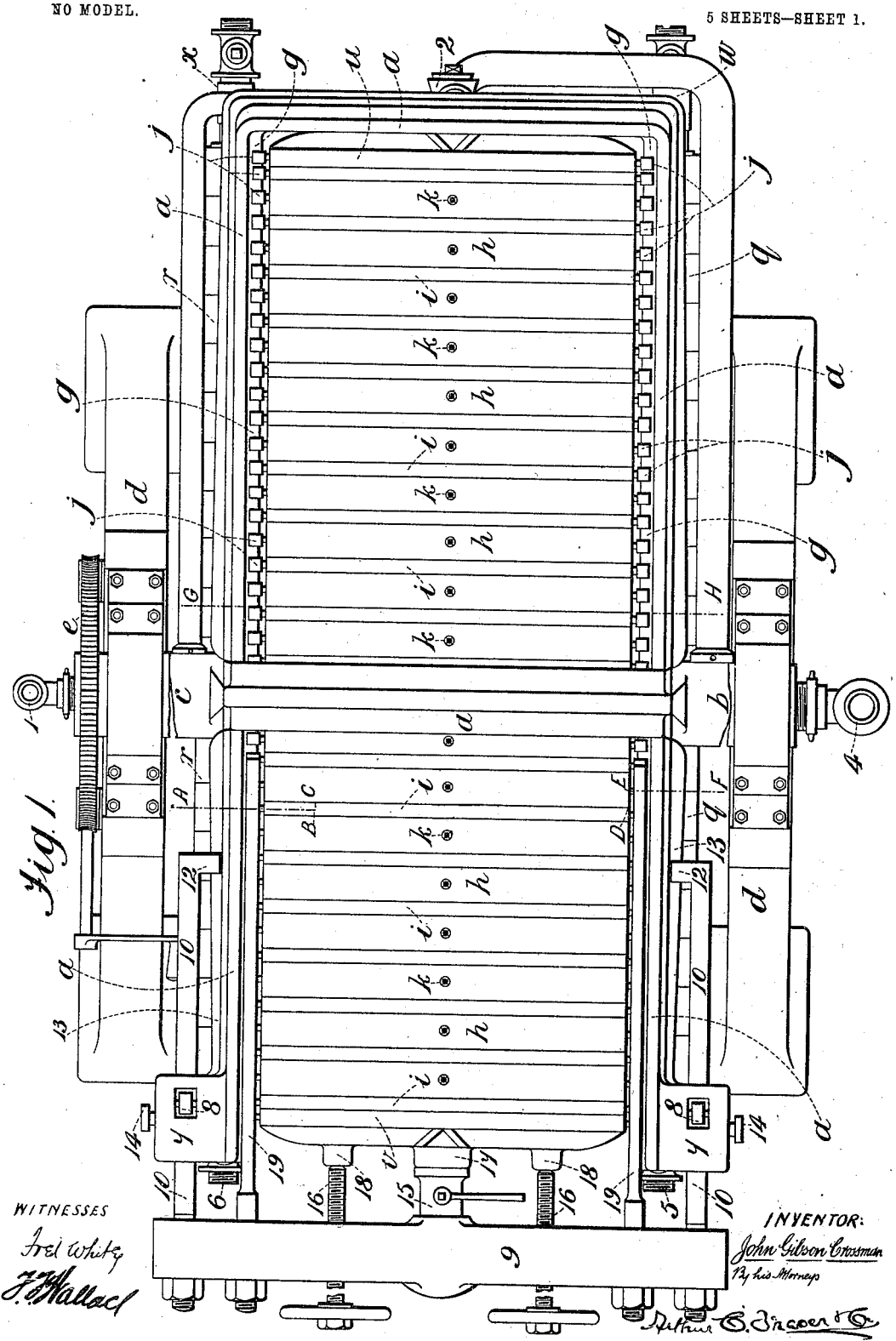

No. 719,438. PATENTED FEB. 3, 1903.
J. G. CROSSMAN.
FILTER AND EXTRACTOR PRESS.
APPLICATION FILED APR. 25, 1902.
NO MODEL. 5 SHEETS—SHEET 5.
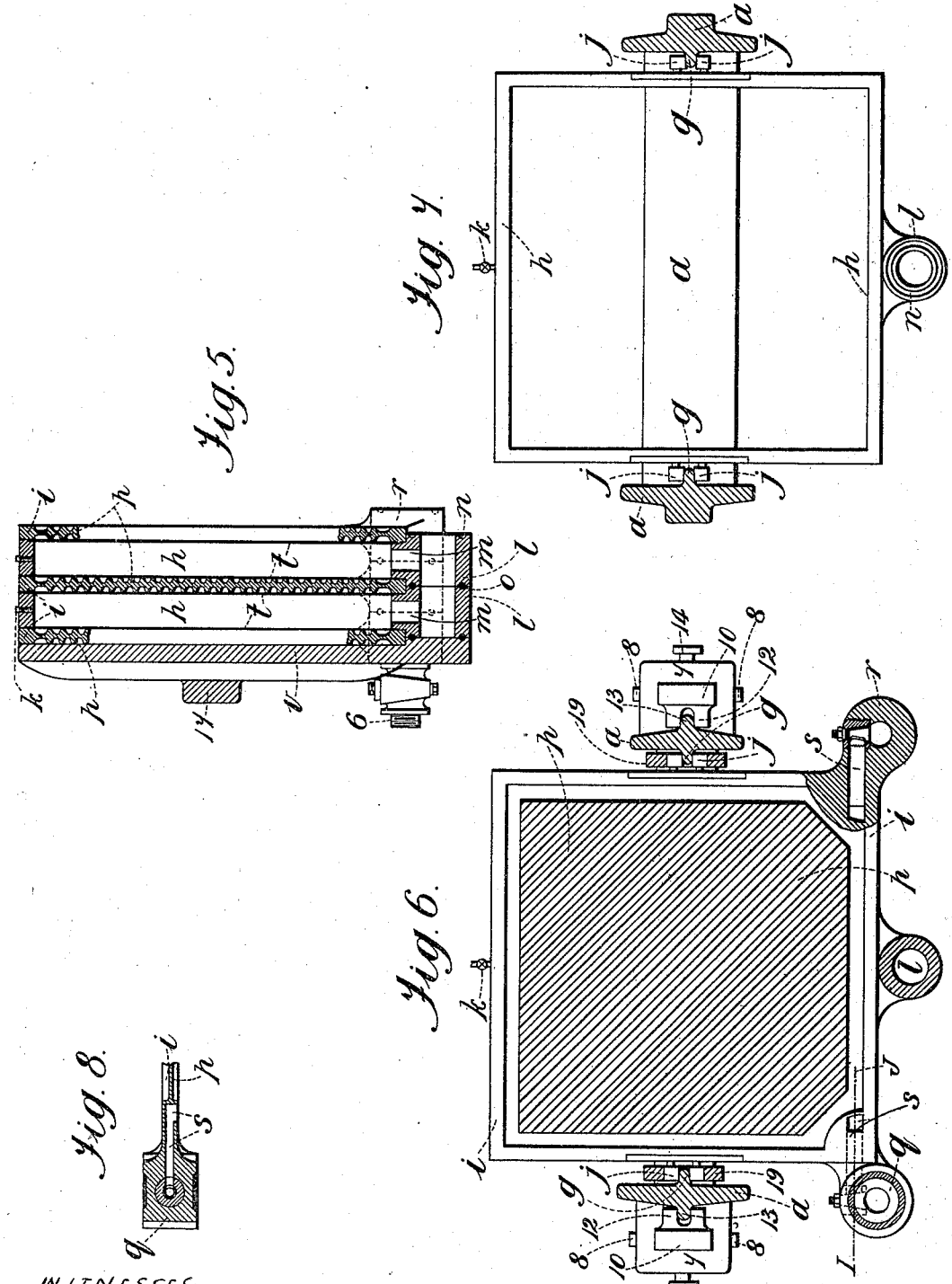
WITNESSES:
Fred White
F. F. Wallace
INVENTOR
John Gibson Crossman,
By his Attorney

UNITED STATES PATENT OFFICE.

JOHN G. CROSSMAN, OF WATFORD, ENGLAND.

FILTER AND EXTRACTOR PRESS.

SPECIFICATION forming part of Letters Patent No. 719,438, dated February 3, 1903.

Application filed April 25, 1902. Serial No. 104,632. (No model.)

*To all whom it may concern:*

Be it known that I, JOHN GIBSON CROSSMAN, brewer, of Cannon House, Watford, in the county of Herts, England, have invented certain new and useful Improvements in Filter and Extractor Presses, of which the following is a specification.

This invention relates to filter and extractor presses, and has for its object to improve the construction of such a machine and render the same more efficient and economical in use.

A filter or extractor press made in accordance with my invention comprises a main frame pivotally supported and means for turning said frame on its axis, press-frames for holding the material to be filtered or treated adapted to slide in the main frame, corrugated intermediate plates or partitions between the press-frames, also adapted to slide on the main frame, said press-frames having one or more bosses of annular or other suitable form and disposed externally of the apparatus or externally of the filtering or working area of the frame, said bosses being adapted in use to form one or more continuous external inlet-pipes with a branch to each press-frame. The said intermediate plates also have one or more bosses of annular or other suitable form disposed externally of the apparatus or externally of the filtering or working area of the frame, said bosses being adapted in use to form one or more continuous external inlet and outlet pipes with a branch (or branches) from each intermediate plate, means for closing the press-frames and bosses together, so as to form separate compartments, (with the use of cloths,) and continuous inlet and outlet pipes, with connections from each compartment to said pipes, and means for reversing the direction of the flow of liquid in the press, and means for cutting out any one or more sections of the apparatus when in use.

A filter or extractor press made in accordance with my invention is adapted to lie horizontally or to be turned up vertically on its axis. In use this latter position (when there is not sufficient material to fill the filter) causes the material to be spread evenly over the filtering cloths and plates, and in this way none of the liquor used for washing the material can pass through without being utilized.

A greater efficiency and range of capacity is thus obtained. This overcomes the necessity of removing or blanking off sections of the filter-press, as hitherto adopted. A further advantage is gained in the ease by which the frames can be opened or closed when the press is inclined as required. The direction of flow of the washing liquor is under perfect control, so that the liquid can be let in on either side of the intermediate plates and passed through the filtering-cloths and material under treatment in either direction and out at the opposite corner of the frame or compartment, which is advantageous in case the filter chokes, and in the event of a filtering-cloth bursting the flow of liquid may be directed so as to wash into instead of out of the burst, thus securing the extract without washing out the solid matter. The arrangement of external pipe connections described obviates the necessity of cutting or making special holes in the filter-cloths, so that by the improved construction a plain strip of material may be used in place of the specially-fitted filter-cloths hitherto employed.

In one form of press made in accordance with my invention the press-frames and intermediate plates having annular bosses adapted to form continuous external inlet and outlet pipes are supported in a frame which is pivoted on a hollow axle or trunnions resting on bearings supported by standards. The inlet and outlet pipes to the filter are connected to this axle by suitably-packed connections, so that the entire body of the filter can be turned by a wheel and worm or other means without breaking the connections. Where the axle is not made hollow, the connections of the feeding and outlet passages can be made by means of flexible pipes.

As a means for opening or closing the filter I use a movable end, with guides which are secured by means of pins. To this end are secured forked runs, along which the plates slide when the filter is opened. As a convenient means for tightly closing the filter this movable end also contains a hydraulic ram and screwed rods disposed so as to maintain the pressure uniformly when once the ram has secured it.

Figure 2:
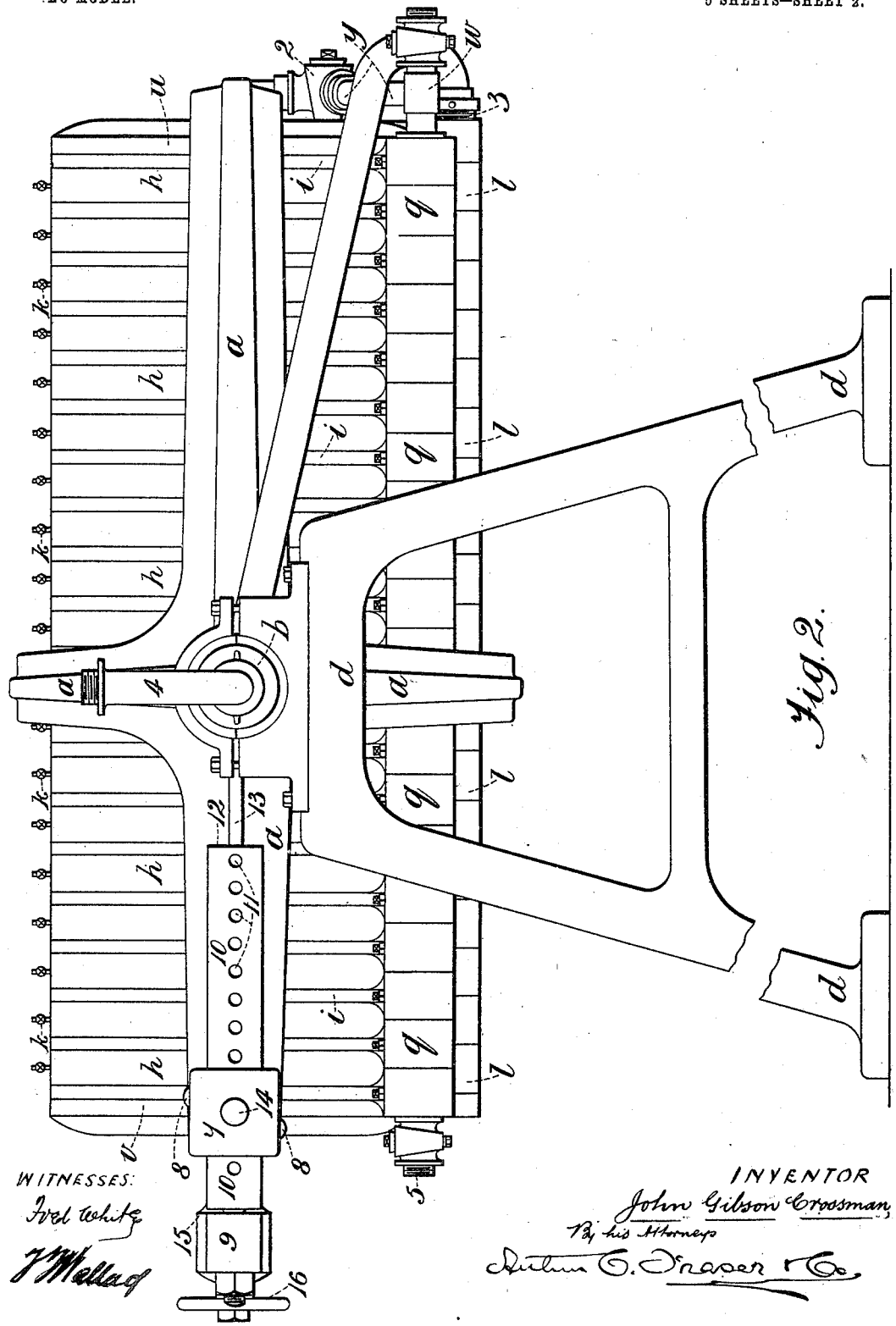
Figure 3:
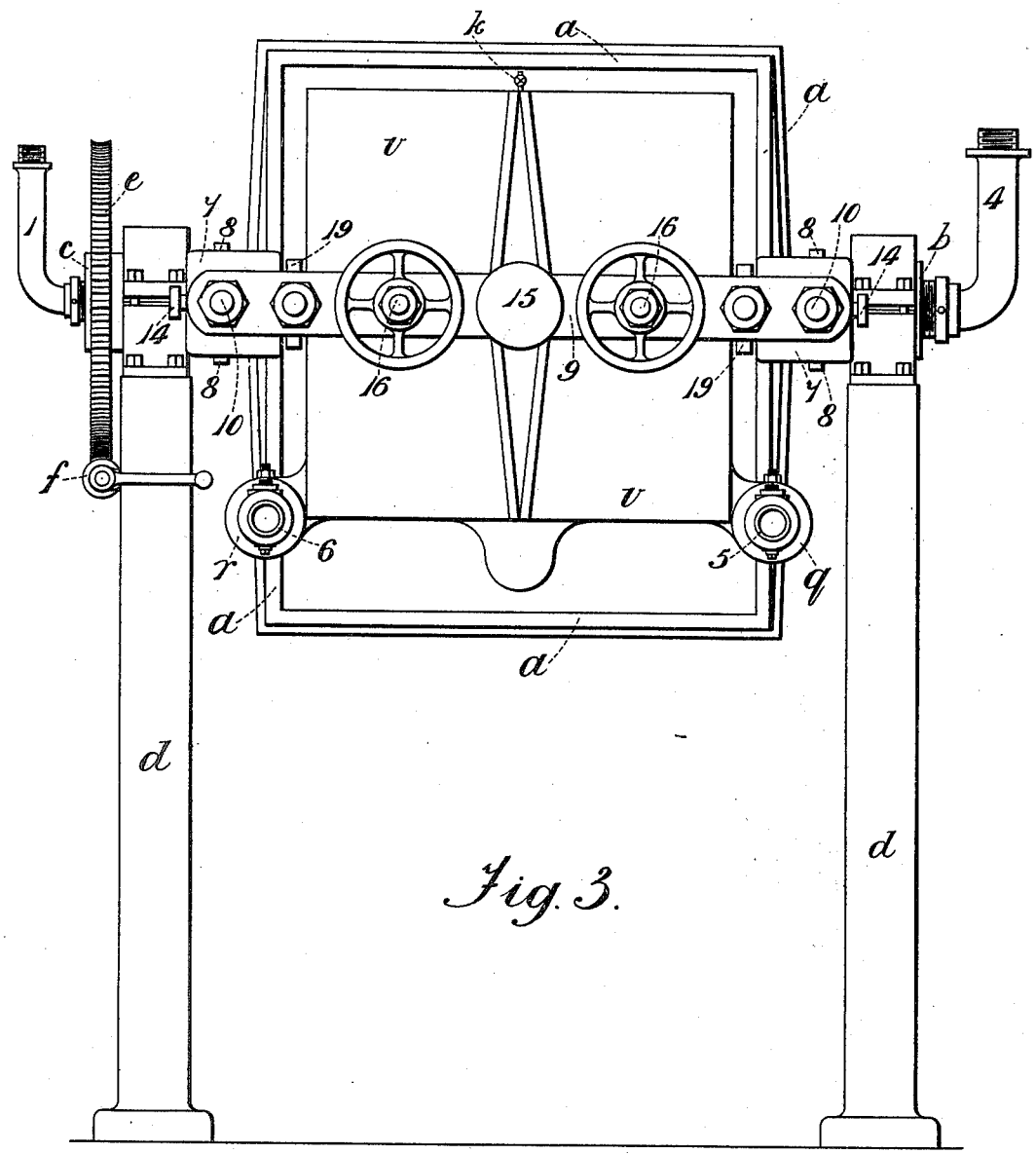
Figure 4:
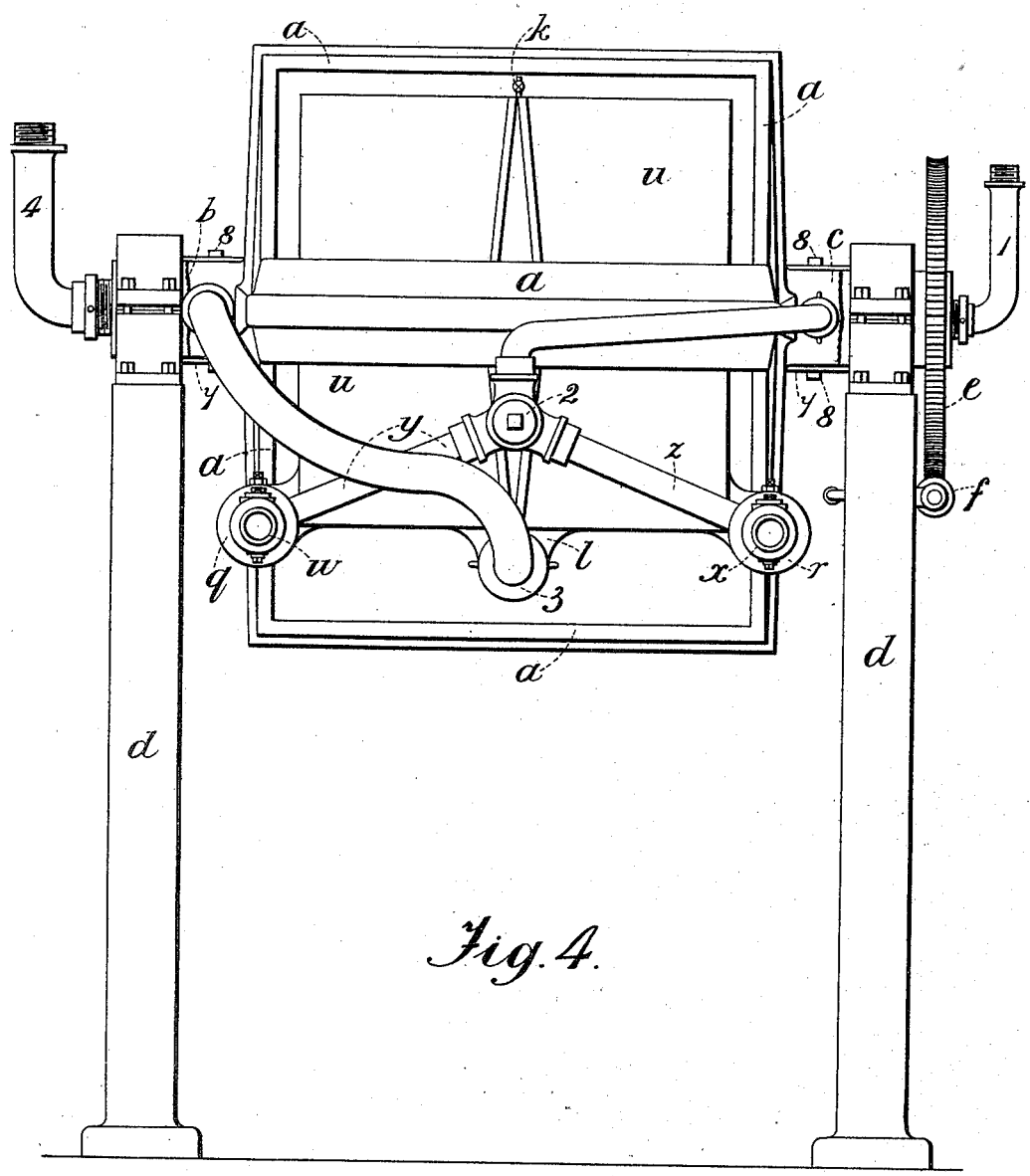

Referring to the drawings, Figure 1 is a plan of one form of filter-press made in accordance with my invention. Fig. 2 is a side elevation; Fig. 3, a front end elevation; Fig. 4, a back end elevation; Fig. 5, a part longitudinal vertical central section; Fig. 6, a transverse section on line A B C D E F in Fig. 1; Fig. 7, an end view showing one press-frame and section of main frame on line G H in Fig. 1, and Fig. 8 a horizontal section on line I J in Fig. 6.

The main frame $a$ of the apparatus is supported by two hollow trunnions $b$ $c$, resting on bearings carried by standards $d$ $d$. To one of the trunnions is fitted a toothed wheel $e$, adapted to gear with a worm $f$, mounted on a standard $d$. The frame $a$ is provided with internal flanges $g$ and carries press-frames $h$ and intermediate plates $i$, arranged alternately. The frames $h$ are open-ended and rectangular in shape, and each is provided with rollers $j$, adapted to engage and run on either side of the flange $g$. The frame is also provided with an air-outlet tap $k$ in any convenient spot, and one side of the frame $h$ is provided with an annular boss $l$, having an orifice $m$, leading therefrom to the inside of the frame $h$. The width of the boss $l$ is greater than the width of the frame $h$ by an extent equal to the width of an intermediate plate $i$. The boss $l$ is provided with a groove $n$, adapted to receive an annular packing-ring $o$, of rubber or like material. The intermediate plates $i$ are provided with diaphragms $p$, having diagonal corrugations. Two of the corners of each of the intermediate plates are provided with annular bosses $q$ $r$, one boss having a passage $s$, leading to one side of the diaphragm, and the other boss having also a passage $s$, leading to the other side of the diaphragm. Each passage from the boss is provided with a cock. Each intermediate frame is also provided with rollers $j$ $j$, adapted to engage and run on either side of the flange $g$ of the frame $a$. The width of the annular bosses $q$ and $r$ are greater than the width of the frame $i$ by an extent equal to the width of the frame $h$. The bosses are provided with annular grooves adapted to receive an annular packing of rubber or like material. Filter-cloths $t$ are stretched over each side of these intermediate plates, and when the press is closed they form a cover to each press-frame.

Mounted upon the main frame are two end plates $u$ $v$, which are provided with rollers $j$, like the press-frames, and intermediate plates. The back plate $u$ is provided with a central pipe connection 3, corresponding to and in line with the annular boss $l$, said pipe connection being in communication with the supply-pipe 4 through the hollow trunnion $b$. The plate $v$ is formed with a flange for closing the adjoining end of the pipe constituted by the bosses $l$. The last intermediate plate at one end (see Fig. 4) is fitted with connections $w$ $x$, having cocks and screwed ends. These connections are provided with branch pipes $y$ $z$, leading to pipe 1 through a three-way cock 2 and hollow trunnion $c$. The annular bosses of the last intermediate plate at the other end are fitted with pipe connections 5 and 6, having cocks and screwed ends.

Upon the frame $a$ are formed enlarged parts or guides 7 7, provided with friction-rollers 8 8.

9 is a movable end frame having slide-rods 10 10, adapted to work in the guide 7 and between the rollers 8 8. The said guides are formed with holes 11 11. The slide-rods 10 are formed with forked ends 12, adapted to engage the strengthening-rib 13 on the frame $a$.

14 14 are pins adapted to work in the guides 7 and to engage the holes 11 in the slide-rods 10 and hold the same in position.

Upon the end frame 9 is mounted a ram 15 and screws 16 16, adapted to oppose and engage the bosses 17 and 18, respectively.

19 19 are forked guides mounted on the movable end 9 and adapted to form a support to the rollers $j$ in place of the internal rib $g$ on the frame $a$ when the end frame and end plate are drawn back and the frames $h$ and $i$ and plates $u$ and $v$ extend beyond the main frame $a$.

I will now describe the machine as used for the purpose of getting the extract out of a malt mash as made in a brewery.

The filter having been properly put together, with all cloths properly placed and the frames and plates well pressed together and made liquor-tight, all air-taps are opened and the mash allowed to flow from the vessel containing it through the mash-pipe, the hollow trunnion, into the filter by the central pipe connection 3, and thence along the pipe formed by the annular bosses $l$ $l$. The mash finds its way into the frame $h$ $h$ by the orifices $m$ $m$, where it is detained by the filter-cloths, which have been already placed in position, as described. One or more of the cocks on the pipe connections $w$ $x$ 5 6 are opened, and the liquor immediately commences to flow away through the filter-cloths along the corrugations on the intermediate plates or diaphragms out of the passages $s$ $s$ into the pipes formed by the bosses $q$ and $r$ and out through one or more of the pipe connections $w$ $x$ 5 6 as may be opened, leaving the solid matter in the filter-press between the filter-cloths. When the filter is full or the desired quantity has been passed therein, the mash can be thoroughly washed to obtain all the extract it contains by allowing the liquor used for washing to enter the filter-press by the pipe 1 through the three-way cock 2, branch pipes $y$ or $z$, and into one or other of the pipes formed by the annular bosses $q$ and $r$, according to the way the cock 2 is turned. The washing liquor is admitted by the pipe 1 and passes through the hollow trunnion at that side of the press, thence down the inclined portion of the pipe 1 to the three-way cock 2. According to the position in which this cock is turned the liquid passes down either the pipe $y$ or pipe $z$ to the pipe constituted by the bosses $q$ or $r$, as the case may be. The liquor passes through the passages *s s* connecting the pipe which may happen to be used as the inlet along the corrugations on the diaphragms, through the filter-cloths on one side of the frames, through the solid material left in the frame *h*, through the filter-cloths on the other side of the frames, and out through passages *s s* to the pipe formed by the bosses *q* or *r* which may happen to be in use as the outlet. The direction in which the material is washed is purely optional, depending entirely upon the side the liquor is allowed to enter, the exit being on the side opposite to that at which it entered after having passed through the mash. The position of the filter is also optional. If the operator wishes, he may wash through vertically upward or directly the reverse. If the filter be not quite full, one of these directions is essential to the proper extraction of the malt. If the washing liquor has not sufficient pressure to pass through the substance in the press-frame, it can be forced through by any suitable means. To remove the solid material left in the filter after it has been sufficiently washed, the screws 16 16 are slackened and the end frame 9 drawn out sufficiently far to allow the frames *h* and *i* to separate, each frame moving on its rollers *j j* along the flanges *g g* or forked guides 19 19. The material is then easily removed and the frames washed and closed again by means of the ram 15 and screws 16, ready again for use.

What I claim, and desire to secure by Letters Patent, is—

1. The improved filter and extractor press comprising a frame supporting the sectional filter, hollow trunnions upon which said frame is pivotally mounted, hollow press-frames forming the compartments of the filter and holding the material to be treated, corrugated intermediate partition-plates disposed between the press-frames and carrying filtering fabric on either side of the corrugated plates, annular bosses on the press-frames externally of the filtering area of the intermediate plates, said bosses forming when the several press-frames and intermediate plates are closed together a continuous inlet-pipe for conveying the material to be treated to the compartments of the filter, two similar bosses on the intermediate plates forming when the parts are assembled continuous inlet and outlet pipes for the liquor to be treated, passages in one set of said bosses leading from one pipe to one side of the intermediate plate and passages leading from the other pipe to the other side of the intermediate filter-plate, connection from said liquor inlet and outlet pipes to one hollow trunnion and connections from the pipe formed by bosses of the compartment-frames leading to the other hollow trunnion means for allowing the plates and frame of the filter to be separated or assembled, and means for securing them in position when assembled, all substantially as set forth.

2. The improved filter and extractor press comprising the combination of a pivoted frame, an extensible portion of said frame, guides disposed longitudinally upon said frame, means for extending the guides when the frame is extended, a series of compartment-frames, a series of partition-frames carrying filtering fabric mounted on each side thereof, roller connections between the compartment-frames and the guides on the pivoted frame and roller connections between the partition-frames and the guides on the pivoted frame, end plates for the frames, means for closing the series of compartment and partition frames together, inlet and outlet pipes formed by bosses on the partition-frame, passages leading from the inlet-pipe to one side of the partition between the same and the filtering fabric and passages from the outlet-pipe to the other side of the partition between the same and the filtering fabric, means for converting the outlet-pipe to an inlet-pipe and the inlet-pipe to an outlet-pipe, a pipe in communication with the compartment-frames and formed by bosses on said frames when the parts are assembled, all substantially as set forth.

3. In filter or extractor presses formed of compartment-frames and partition-frames held together, the combination of a partition-frame, a partition disposed centrally of said frame, filtering fabric disposed on each side of said partition, two annular bosses on said frame said bosses being disposed beyond the filtering area, a through-opening on said bosses, a passage from the opening in one boss to one side of the partition between same and the filtering fabric, a passage from the opening in the other boss to the opposite side of the partition between same and the filtering fabric substantially as set forth.

4. In filter or extractor presses formed of compartment-frames and partition-frames held together, the combination of a partition-frame, filtering fabric disposed on each side of said partition, two bosses on said frame said bosses being disposed beyond the filtering area, through-openings in said bosses, a passage from the opening in one boss to one side of the partition and opening between same and the filtering fabric, a passage from the opening in the other boss to the opposite side of the partition and opening between same and the filtering fabric, corrugations on opposite sides of said partition, said corrugations forming channels leading to and from said passages to the bosses, substantially as set forth.

5. In filter or extractor presses the combination with a series of compartment-frames and a series of partition-frames of an extensible supporting-frame, guides on said supporting-frame, pairs of rollers on the compartment and partition frames one pair of rollers on each frame the said rollers engaging between them the guide on supporting-frame, a sliding extensible end to said supporting-frame, a bifurcated part of said extensible end, whereby the rollers and their frames are supported both when the supporting-frame is extended and the press-frames separated and also when the said parts are assembled and closed for use substantially as set forth.

6. In a filter or extractor press the combination with a series of compartment-frames and intermediate partition-frames of a supporting-frame, means for extending said supporting-frame and allowing the compartment and partition frames to be disconnected or assembled, means for closing said frames together and means for securing same in closed position, hollow trunnions on which the supporting-frame is pivotally mounted, pipes forming communication between the hollow trunnion and the inlet to the compartment-frames, pipes forming communication between the other trunnion and the inlet and outlet pipes which lead to opposite side of the partition-frame, a three-way cock for reversing the flow of the liquid, substantially as set forth.

In witness whereof I have hereunto signed my name in the presence of two subscribing witnesses.

JOHN G. CROSSMAN.

Witnesses:
  HENRY BROWN,
  GERALD ETESON.